Aug. 15, 1972     P. G. HERREMANS     3,684,501

PHOTOGRAPHIC COLOUR CORRECTION METHOD

Filed March 31, 1971

3,684,501
PHOTOGRAPHIC COLOUR CORRECTION
METHOD
Pieter Gommer Herremans, 9 Auwersstraat,
B 2600 Berchem, Belgium
Filed Mar. 31, 1971, Ser. No. 129,779
Claims priority, application Great Britain, Apr. 14, 1970,
17,751/70
Int. Cl. G03c 7/18
U.S. Cl. 96—5   8 Claims

ABSTRACT OF THE DISCLOSURE

A method of reproducing a colour original onto a photographic light-sensitive reversal type multicolour material wherein first the multicolour material is given a normal exposure to the colour original, and, second, the multicolour material is given an additional exposure to a black-and-white mask of the colour original. The black-and-white mask is a separation negative of the colour original produced by exposure of the colour original onto a black-and-white light-sensitive material by means of light in the spectral region which is complementary to the spectral region wherein the colour original shows an undesired side-absorption, and the additional exposure of the multicolour material to the black-and-white mask occurs by means of light which corresponds to the part of the spectral region wherein the undesired side-absorption occurs.

---

The present invention relates to a method for reproducing a colour original onto a photographic light-sensitive multicolour copying material.

It is generally known that almost any colour original, e.g. a printed colour image or a photographic reproduction such as a colour transparency or a colour positive that has been printed from a colour negative, shows colour deviations due to the deficiencies of the dyestuff or dyestuffs constituting the colour image. The most important of these dyestuff deficiencies is known as side-absorption, which means that a certain dyestuff not only absorbs in the spectral region that is complementary to its intended colour, but also absorbs in the spectral regions of the light it should completely transmit. For instance, a photographic magenta dyestuff absorbs light in the green region of the visible spectrum, but it also absorbs an important part in the blue region, and a minor part in the red region.

At the reproduction of the colour original the effects of the side-absorption of the dyestuffs produced in the copying material are added to the colours of the original so that the reproduction is not a true colour rendering of the original.

It is an object of the present invention to provide a method for producing a higher fidelity colour reproduction of a colour original.

According to the present invention this object is accomplished by effecting, in addition to the usual exposure of the multicolour material to the colour original, a supplemental exposure, viz by exposing that layer of the multicolour material in which light rays having a wavelength corresponding to the side-absorption of a dyestuff image of the colour original are recorded to a negative mask image of said dyestuff image.

Thus the present invention relates to an improved method of reproducing a colour original onto a photographic light-sensitive multicolour material, the improvement comprising exposing prior to the development, the layer of the multicolour material in which light-rays having a wavelength corresponding to a side-absorption of a dyestuff image of the colour original are recorded to a negative mask image of said dyestuff image which exposure is in addition to the usual image-wise exposure of the multicolour material to the colour original.

Figure 1:
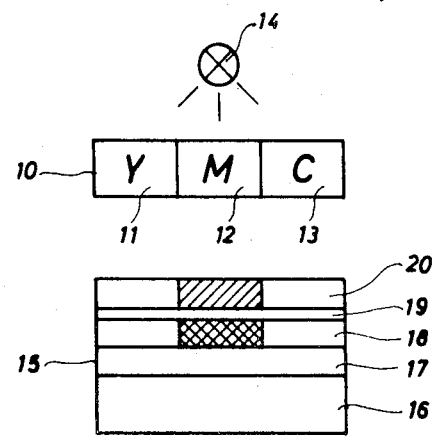
Figure 2:
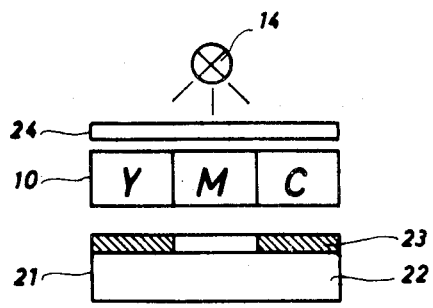
Figure 3:
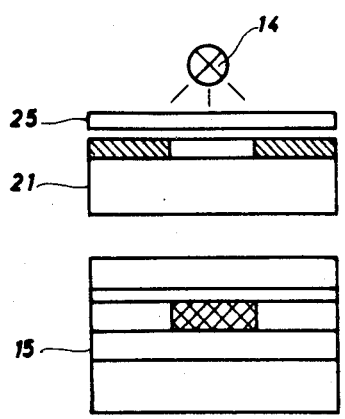

The present invention has been particularly developed for the duplication of photographic colour transparencies and a specific example will be described hereinafter with reference to the accompanying drawings wherein:

FIG. 1 illustrates diagrammatically the exposure of the copying material to the original, FIG. 2 shows diagrammatically the exposure for the production of the negative mask image, and FIG. 3 shows diagrammatically the additional exposure of the copying material to the mask.

The original 10 of FIG. 1 is a photographic multicolour transparency, which comprises three colour areas in juxtaposition, viz a yellow area 11, a magenta area 12, and a cyan area 13. Said original is exposed in a conventional contact copying apparatus by means of a white light source 14 onto a copying material 15, which for the sake of clarity has been drawn separated from the colour original 10. The composition of the copying material is as follows. A transparent hydrophobic film support 16 provided in succession with: a layer 17 in which the part of the image of the original, which part absorbs in the red region of the spectrum will be recorded, called hereinafter the red-sensitive layer, in which a cyan separation image is to be formed after colour development; a layer 18, in which the image of the original, which is in the green region of the spectrum, will be recorded, called hereinafter the green-sensitive layer, in which a magenta separation image is to be formed after colour development; a blue absorbing bleachable filter layer 19; a layer 20, in which the image of the original which is in the blue region of the spectrum, will be recorded, called hereinafter the blue-sensitive layer in which a yellow separation image is to be formed after colour development.

The exposure was adjusted in such a way that if the exposed copying material were now directly processed, a normal reproduction (i.e. falsified as a consequence of the side-absorption of the dyestuffs of the copying material, would be obtained.

A light-sensitive black-and-white film material 21 (FIG. 2) comprising a transparent hydrophobic support 22 and a silver halide emulsion layer 23, which is spectrally sensitive in the whole visible region of the spectrum, is now exposed in contact to the original 10, by means of the light source 14, a green filter 24 being provided in the exposure beam. After development a black-and-white negative mask image of the magenta image of the original is obtained (see the hatched parts of the layer 23). The mask film 21 and the exposure and development thereof are chosen in such a way that the mask image shows a low gradation.

The mask is now placed in contact with the still undeveloped copying material 15 (see FIG. 3) and is exposed for a short while in register with the latent image, which has been formed therein by the first exposure to the light source 14, a blue filter 25 being provided in the exposure beam. This additional exposure causes a supplemental exposure of the blue-sensitive layer of the copying material at the magenta areas, whereas the areas of said blue-sensitive layer corresponding to the yellow and the cyan areas of the original are not exposed because the exposure light is absorbed by the corresponding silver areas of the layer 23 of the mask 21.

The copying material is now subjected to conventional colour reversal processing to produce a colour duplicate of the original.

The improvement thus obtained is described hereinafter by comparison with a conventional exposure wherein no masking is applied. In this explanation we admit that the magenta dyestuff has only a side-absorption in the blue region of the spectrum, and that the other dyestuffs have no side-absorption at all.

At the exposure of the copying material to the original a latent image of the magenta area is obtained in the red and blue-sensitive layers of the copying material. Owing to the fact that the dyestuff of the magneta area of the original incompletely transmits the blue light, the blue-sensitive layer of the copying material is insufficiently exposed. As a consequence thereof the colour reversal image produced in the copying material comprises a yellow image, the colour density of which is low (single hatching) in the blue-sensitive layer, in addition to the magenta image, the colour density of which is maximum (cross hatching) in the green-sensitive layer (FIG. 1). The duplicate thus produced does not correspond with the original, because the blue light is not only absorbed in the imperfect magenta dye of the copying material, but additionally in the yellow dye, so that the image looks reddish rather than magenta.

According to the method of the invention, the copying material is exposed again in order to increase the transmission of the blue light to compensate for the unwanted and unavoidable absorption of said light in the magenta layer. Practically, this is done by exposing the copying material through the mask of the magenta image of the original with blue light so as to expose the blue-sensitive layer of the copying material, whereby the density of the yellow image at the magenta area is reduced or no yellow image is produced at all.

In case the side-absorption of the cyan dyestuff in the green region has to be corrected, a mask image has to be produced by exposure of a mask film to the original through a red filter and, by additionally exposing the copying material through a green filter.

It will be understood that other side-absorptions can be corrected in a similar way by exposing the mask film in an appropriately chosen spectral range to the original, and by exposing the copying material appropriately and again to said mask.

It will be clear that one mask may serve to correct two side-absorptions, e.g. a mask film that has been exposed through a green filter to the original may be used to expose the copying material additionally through a blue filter and a red filter successively, or through a magenta filter simultaneously, in order to compensate for the side-absorptions of the magenta dyestuff in the blue and the red regions respectively.

The embodiment described hereinbefore related to a contact reproduction of the original on a scale 1/1, but it will be understood that the reproduction may also occur on a different scale by using a photographic enlarger or reprocamera. The example described hereinafter relates to a reproduction by means of an enlarger.

The method according to the present invention has been carried out with success as follows:

A colour picture, e.g. studio set-up, which had been taken on an Agfacolor CT 18 film (a conventional colour reversal film) was duplicated on a Duplichrome D 13 film (a colour reversal duplicating film with a $\gamma=1.0$).

(1) The colour original is placed in a photographic enlarger that is adjusted in order to produce an image of the original of the required enlargement onto a vacuum frame.

(2) A register strip is placed on the vacuum frame for exactly determining the position of a film sheet on said frame.

(3) A Gevatone Pan P 23p film (a conventional continuous tone black-and-white film) is perforated and attached to the notches of the register strip.

(4) The Gevaton Pan film is exposed to the original through a green filter and developed in the G5c developer. The density of the negative mask image is comprised between 0.10 and 1.6–1.7.

(5) The Duplichrome D 13 film is perforated and attached to the register strip on the vacuum frame. The film is exposed to the original by means of a white light source, the spectral composition of which being occasionally adjusted by means of complementary filters (yellow, magenta, or cyan) so as to produce a neutral rendering of the colour original on the Duplichrom D 13 film.

(6) The mask film is placed in contact on and in register with the Duplichrome D 13 film on the vacuum frame, the colour original is removed from the enlarger and a blue filter is inserted in the enlarger, whereupon the Duplichrome D 13 film is exposed again.

(7) The Duplichrome D 13 is removed from the vacuum frame and is devoloped for 8 minutes at 240° C. in the Agfa-Gevaert 41 FD black-and-white developer, introduced for 2 minutes in a stopbath 41ST, rinsed for 4 minutes, overall exposed to white light, colour-developed in Agfa-Gevaert 41 CD colour developer for 10 minutes, rinsed for 11 minutes, bleached in Agfa-Gevaert 41BL bleaching bath for 2 minutes, fixed in Agfa-Gevaert 41FX fixing bath for 2 minutes, rinsed for 3 minutes, and dried.

The duplicate thus obtained is a true colour copy of the original.

Duplichrome, Agfacolor, Gevatone are registered trade names of Agfa-Gevaert Antwerp-Leverkusen for commercially available photographic film.

The effect aimed at by the method of the present invention, i.e. a true duplication of a colour original, is best achieved if the side-absorptions of the dyestuffs of the copying material are equal to the side-absorptions of the corresponding dyestuffs of the colour original. If the side-absorptions of the dyestuffs used in the copying material are greater than the side-absorptions of the corresponding dyestuffs of the original, the method according to the invention permits an improvement over the conventional reproduction to be obtained but the improvement is not as great as it is in the case said side-absorptions equal each other.

The exposure of the multicolour copying material and of the mask film to the original may occur according to any technique known in the art, e.g. episcopically or diascopically on a scale 1/1, or on a different scale.

The additional exposure to the negative mask image preferably occurs while keeping the latter in contact with the colour copying material in order to have it carried out in perfect register.

The photographic mask image may be a coloured image, or a black-and-white image on a coloured support, transmitting light that will produce a latent image only in that layer or in those layers of the multicolour copying material, in which an additional exposure has to occur. In that case a white light source may be used for the additional exposure. It is even possible to use such a coloured mask image in combination with a coloured filter. Preferably, however, the photographic mask image is a negative silver mask image, which is used in combination with a coloured filter for carrying out the additional exposure of the copying material. The light-sensitive material used for producing the negative mask preferably comprises a usual hydrophobic transparent film support provided with a light-sensitive silver halide emulsion layer having been spectrally sensitized complementary to the separate image of the colour original to be registered therein.

The composition of the multicolour copying material is dependent on the kind of the reproduction system used. For carrying out the method of the present invention any positive-positive or positive-negative colour reproduction system may be used. In this respect reference may be made to colour reproduction systems described in the United Kingdom patent specifications 990,628; 1,151,363 and 1,150,553 and in the French patent specifications 1,541,559; 1,541,561 and 1,541,985. However, the method of the present invention is preferably applied in the well-known reversal colour reproduction system in which the copying material comprises a transparent hydrophobic film support. The processing of the copying material, after it has been exposed according to the present invention as described above is generally known in the art, so that a further explanation thereof is superfluous.

I claim:
1. In a method of reproducing a color original onto a photographic light-sensitive multicolor material by exposure of the material to said original and color development of said exposed material, the improvement comprising prior to such development, exposing the layer of the multicolor material which records light-rays having a wavelength corresponding to a side-absorption of a dyestuff image of the color original to a negative mask image of said dyestuff image, said exposure to said mask image being in addition to the imagewise exposure of the multicolor material to the color original itself.
2. Method according to claim 1, wherein the photographic colour original is a colour transparency.
3. Method according to claim 1, wherein the photographic multicolor material has a transparent support.
4. Method according to claim 1, wherein the multicolour material is of the reversal type.
5. Method according to claim 1, wherein the negative mask image is a photographic black-and-white transparency.
6. Method according to claim 1, wherein the photographic colour original is a multicolour original.
7. Method according to claim 1, wherein the layer of the multicolour material for recording the light rays of the blue region of the spectrum is exposed to a negative mask image of the magenta dyestuff image of the colour original.
8. Method according to claim 1, wherein the layer of the multicolour for recording the light rays of the green region of the spectrum is exposed to a negative mask image of the cyan dyestuff image of the colour original.

References Cited
UNITED STATES PATENTS

| | | | |
|---|---|---|---|
| 2,169,009 | 8/1939 | Seymour | 96—5 |
| 2,203,652 | 6/1940 | Ehrenfried | 96—6 |
| 2,760,862 | 8/1956 | Harsh | 96—6 |

NORMAN G. TORCHIN, Primary Examiner

A. T. SURO PICO, Assistant Examiner

U.S. Cl. X.R.

96—6, 23. 44

UNITED STATES PATENT OFFICE
CERTIFICATE OF CORRECTION

Patent No. 3,684,501      Dated August 15, 1972

Inventor(s) PIETER GOMMER HERREMANS

It is certified that error appears in the above-identified patent and that said Letters Patent are hereby corrected as shown below:

In the heading to the printed specification, after line 5, insert -- Assignor to Agfa-Gevaert, Mortsel, Belgium --.

Signed and sealed this 8th day of May 1973.

(SEAL)
Attest:

EDWARD M. FLETCHER, JR.
Attesting Officer

ROBERT GOTTSCHALK
Commissioner of Patents